United States Patent Office 3,594,266
Patented July 20, 1971

3,594,266
COMPOSITE FILAMENT
Kaoru Okazaki and Yoichi Shimokawa, Nagoya, Japan, assignors to Toyo Rayon Kabushiki Kaisha, Tokyo, Japan
No Drawing. Filed May 21, 1968, Ser. No. 730,923
Claims priority, application Japan, June 3, 1967, 42/35,150
Int. Cl. D02g 3/02
U.S. Cl. 161—173                                    6 Claims

ABSTRACT OF THE DISCLOSURE

Composite polyamide filament having improved antistatic properties, wherein one of the components is composed of synthetic polyamides, and another composed of a polymer blend of a polyamide and a block-copolyetheramide. The block-copolyetheramide comprises 15 to 85%, preferably about 20 to 60% by weight of polyether segments, which segments should present in an amount of 0.1 to 10%, preferably about 0.3 to 5% by weight based on the composite filament. It is advantageous that each of the polyether segments contains about 45 to 130 ether oxygen atoms.

---

This invention relates to composite filaments and fibers which possess excellent antistatic property.

We have previously proposed the composite filaments composed of block-copolyetheramide as the first component and polyamide as the second component (Japanese patent application No. 8,559/1966, filed on Feb. 14, 1966). The composite filaments exhibit improved hygroscopicity and antistatic property, and most of them possess latent crimpability.

It has now been discovered that, if the above block-copolyetheramide is replaced by a polymer blend composed of a minor amount of a block-copolyetheramide of relatively high polyether segment content and a major amount of a polyamide, composite filaments of still improved antistatic properties are obtained.

Thus, the invention provides a composite filament wherein at least two components of fiber-forming polymeric materials are arranged in intimate adherence to each other along the length of the filament, one of said components being composed of a synthetic polyamide, which is characterized in that another of said components is composed of a polymer blend of a polyamide and a block-copolyetheramide, the latter being a block-copolymer comprising polyamide segments and 15 to 85%, preferably about 20 to 60%, by weight of polyether segments, and said polyether segments being present in an amount of 0.1 to 10%, preferably about 0.3 to 5%, by weight based on the composite filament.

By "block-copolyetheramide" herein referred to, is meant a block-copolymer in which polyether segments and polyamide segments are bound linearly. Such block-copolyetheramides may be prepared, for example, by:

(A) Subjecting one or more polyamide precursors, such as lactams, ω-amino-carboxylic acids and nylon salts, to polycondensation conditions in the presence of a polyether which has terminal amino group or groups or its salt with an organic acid; or (B) Subjecting one or more polyamide precursors to polycondensation conditions in the presence of a polyether having terminal carboxyl group or groups or an amine salt of such polyether; or C) Coupling a polyether which has terminal amino groups or carboxyl groups, or an amino group and a carboxyl group, with one or more polyamide oligomers having terminal carboxyl groups (when at least one of terminal groups of the polyether is amino) or terminal amino groups (when at least one of terminal groups of the polyether is carboxyl) or a terminal carboxyl group and an amino group, in a solution or molten state.

As the starting polyethers for the preparation of such block-copolymers, homopolymers and copolymers of alkylene oxides such as ethylene oxide, propylene oxide, butylene oxide and tetramethylene oxide are used with advantage. By cyanoethylating and hydrogenating such alkylene oxides, polyethers having amino groups at both terminals are obtained. Also upon hydrolysis of cyanoethylated alkylene oxides, polyethers having carboxyl groups at both terminals are obtained.

Preferred polyethers have such chain length as will provide block-copolymers of which each polyether segment possesses, on the average, approximately 20 to 180, particularly approximately 45 to 130, oxygen atoms.

As the polyamide precursors suited for the preparation of the block-copolymer, the following are preferred: lactams of 6–12 carbons, particularly ε-caprolactam; ω-aminocarboxylic acids such as 6-aminocaproic acid, 9-aminononanoic acid, 10-aminocapric acid, and 11-aminoundecanoic acid; and nylon salts of hexamethylenediamine or meta-xylylenediamine with adipic, sebacic, suberic, dodecanediaic, terephthalic or isophthalic acid.

The block-copolyetheramide used in the invention is in no way limited by the preparation method thereof. However, the method (A) above, inter alia, the method of heating a polyamide precursor to a temperature between 200° and 270° C., in the presence of a salt of a polyether having amino groups at both terminals with an aliphatic or aromatic dicarboxylic acid mentioned above, is advantageous.

The block-copolyetheramide containing 15–85 wt. percent of polyether segments is mixed with a polyamide, and the resulting polymer blend is compounded with another component, i.e., polyamide. The blend ratio of the block-copolyetheramide and the polyamide in said polymer blend is so selected to reduce the polyether segment content of the composite filament to 0.1 to 10%, preferably approximately 0.3 to 5%, by weight based on the composite filament. In most cases, it is preferred to blend a minor amount of the block-copolyetheramide with a major amount of polyamide.

Each constituent of the composite filament of this invention may contain conventionally employed additives, such as stabilizers, e.g., viscosity stabilizer, antioxidant, heat- and light-resisting agents, etc., delusterant and other pigments. Also each constituent may contain other additional polymer or polymers.

The two or more components in the composite filament may be present in side-by-side relationship or in core-(or cores)-in-sheath relationship. The core (or cores) and sheath can be arranged either concentrically or eccentrically.

The composite filament or fiber of this invention can be prepared by the means known per se. In binary composite fiber, the ratio of the components is 90–30 wt. percent of the polyamide, particularly 80–50 wt. percent, for easier practice. In case of ternary or higher order composite fibers, it is appropriate to cause every component to be present in an amount of at least 10 wt. percent.

In the following examples, the relative viscosity is that measured at 25.0° C. with the solution of 1 g. of the polymer in 100 ml. of the indicated solvent.

Antistatic properties were measured as follows:

(A) *Frictional static charge.*—The drawn filaments were knit, and rubbed with a piece of Tetron film. The static charge thereby built up was measured with a rotary static tester, at 20° C., and 65% RH.

(B) *Specific resistance.*—The drawn filaments were bundled, and the resistance across the bundle was measured as the base for the calculation of specific resistance, at 20° C., and 65% RH.

EXAMPLE 1

A salt formed of equimolar amounts of a polyethylene oxide (number average molecular weight: approximately 4,300) whose terminal groups had been converted to amino groups by more than 95%, and adipic acid was blended with ε-caprolactam. Thus a blend containing 40 wt. percent polyethylene oxide segments was obtained, which was heated at 257° C. for 14 hours in nitrogen atmosphere. Thus obtained polymeric product was extracted with hot water, and dried. The chips formed of this block-copolyetheramide (relative viscosity in m-cresol, $\eta_r=2.30$, as measured at the concentration of 1.0 g./ 100 ml. of the solvent, at 25.0° C.) were mixed with nylon-6 chips (relative viscosity in sulfuric acid, $\eta_r=2.35$, measured at same concentration and temperature as above), at a weight ratio of 1:9. This mixture was fed, as the first component, to a conventional composite melt spinning machine. As the second component, the above nylon-6 polymer alone was used. Thus, a concentric core-in-sheath type composite filament, in which the first component was the sheath and the sheath and the second component was the core, was prepared. The ratio of components was, first component: second component=1:2 (by weight).

As controls, other filaments were separately prepared as follows.

Control 1

Employing the same polyethylene oxide diamineadipic acid salt as used in Example 1, a block-copolyetheramide containing approximately 4 wt. percent of polyethylene oxide segments was synthesized. Thereafter in the similar manner as in Example 1 except the use of the above block-copolyetheramide as the first component, a concentric core-in-sheath type composite filament was prepared.

Control 2

A filament was prepared from the first component of Example 1 alone.

Control 3

A filament was prepared from the second component (nylon-6) of Example 1 alone.

The above various filaments were cold-drawn by a draw ratio of approximately 3.8 times. The characteristics of thus obtained drawn filaments are shown in Table I below.

The comparison with the results of Control 1 makes it clear that the filament prepared from the block-copolyetheramide of greater polyethylene oxide content and nylon-6 exhibits better static charge-preventing effect. Also no appreciable difference in antistatic property is recognizable between the products of Example 1 and Control 2, but the present invention is the more advantageous with respect to cost and other fiber properties.

TABLE I

| | Antistatic properties | | Tensile properties | | |
|---|---|---|---|---|---|
| Type of fiber of— | Frictional static charge (v.) | Specific resistance (Ω.cm.) | Tenacity (g./d.) | Elongation (percent) | Initial modulus (g./d.) |
| Example 1 | 350 | $6.2 \times 10^7$ | 5.7 | 34.5 | 27.5 |
| Control 1 | 1,600 | $6.0 \times 10^9$ | 4.9 | 35.0 | 20.8 |
| Control 2 | 280 | $5.1 \times 10^7$ | 5.4 | 34.0 | 26.1 |
| Control 3 | 3,050 | $4.3 \times 10^{10}$ | 5.6 | 34.5 | 27.3 |

The procedures of Example 1 were repeated with the blend ratio of the block-copolyetheramide with nylon-6 in the first component varied each time. Thus concentric core-in-sheath type composite filaments were prepared in which the ratio of the first and second components was 1:1. The properties of the drawn filaments (draw ratio: approximately 3.7 times) are shown in Table II.

TABLE II

| Block-copolymer content in first component (wt. percent) | Polyether segment content in filament (wt. percent) | Frictional static charge (V). | Tenacity (g./d.) | Elongation (percent) | Initial modulus (g./d.) | Uster* unevenness |
|---|---|---|---|---|---|---|
| 0 | 0 | 3,250 | 5.6 | 34.0 | 27.3 | 1.1 |
| 0.25 | 0.05 | 2,800 | 5.7 | 34.0 | 27.2 | 1.0 |
| 1.0 | 0.2 | 1,450 | 5.6 | 35.0 | 27.0 | 1.1 |
| 2.0 | 0.4 | 980 | 5.6 | 35.5 | 27.5 | 0.9 |
| 5.0 | 1.0 | 530 | 5.5 | 34.5 | 27.2 | 1.1 |
| 15.0 | 3.0 | 280 | 5.6 | 34.5 | 20.9 | 1.2 |
| 25.0 | 5.0 | 160 | 5.5 | 34.0 | 26.2 | 1.2 |
| 50.0 | 10.0 | 120 | 5.1 | 35.0 | 24.8 | 1.7 |
| 75.0 | 15.0 | 220 | 4.1 | 34.5 | 18.9 | 2.8 |

*Measured with Uster Evenness Tester.

When the polyether segment content of the composite filaments was below 0.1%, the practically desirable range of static charge-preventing effect was no more obtained. On the other hand, when the content exceeded 5%, its static charge-preventing effect should little improve, but other fiber properties began to deteriorate. When it exceeded 10%, fiber strength and initial tensile resistance exhibited appreciable deterioration, and the spinability also was remarkably impaired, as indicated by the increased Uster unevenness. Accordingly, the polyether segment content of the composite filament suited to the purpose is normally 0.1–10 wt. percent, preferably 0.3–5.0 wt. percent.

EXAMPLE 2

A salt composed of equimolar amounts of polyethylene oxide diamine (number average molecular weight: 3,100) and terephthalic acid was blended with ε-caprolactam. Similarly to Example 1, the blends were polymerized under heating and synthesized into various block-copolyetheramides of polyethylene oxide segment content varied from 5 to 90 wt. percent. Those polymers were used each as the first component, as optionally blended with the poly-ε-capramide of Example 1 so as to have a polyethylene oxide segment content of 5 wt. percent. The first component and the poly-ε-capramide of Example 1 as the second component were melt-spun into a concentric core-in-sheath type composite filament in accordance with the conventional practice. The ratio of the first and second components was 1:3 by weight. The fiber properties of those five types of composite filaments as drawn (draw ratio: approximately 3.8 times, cold drawing) are given in Table III, together with the similar data as to conventional nylon-6 filaments given for comparison.

When block-copolymers containing less than 15 wt. percent of polyether segments were employed, the antistatic property of the products was unsatisfactory, and other properties were also impaired. Whereas, when the polyether segment content exceeded 85 wt. percent, the antistatic property of the product was impaired, quite contradictory to the purpose of the invention. Furthermore, since the block-copolymer of higher polyether segment content becomes water-soluble, any antistatic property of such product will be lost during washing. Also the product exhibited inferior fiber properties in other respects. From the results of Table III, therefore, it can be understood that the use of block-copolymers containing 15-85 wt. percent of polyether segments is appropriate, particularly the range of 20-60 wt. percent being preferred.

relative viscosity in sulfuric acid, $\eta_r=2.55$), and the blend was used as the first component. An eccentric core-in-sheath type composite filament was melt-spun from this component and a nylon-6 polymer (relative viscosity in sulfuric acid, $\eta_r=2.40$) as the second component. The first component became the sheath and the second com-

TABLE III

| First component [b] | | | Antistatic properties | | Frictional static charge after 10 washings (v.) | Tensile properties | | |
|---|---|---|---|---|---|---|---|---|
| Polyether segment content in block-copolymer (wt. percent) | Polyether segment content in filament (wt. percent) | Second component | Frictional static charge (v.) | Specific resistance (Ω. cm.) | | Tenacity (g./d.) | Elongation (percent) | Initial modulus (g./d.) |
| | | Nylon-6[a] | 3,150 | 5.1×10¹⁰ | 3,250 | 5.4 | 35.0 | 26.5 |
| 5 | 5 | do | 1,800 | 2.8×10⁹ | 1,850 | 4.3 | 34.5 | 20.1 |
| 20 | 5 | do | 590 | 1.2×10⁸ | 550 | 5.1 | 35.0 | 25.0 |
| 40 | 5 | do | 320 | 5.3×10⁷ | 310 | 5.4 | 35.5 | 26.0 |
| 60 | 5 | do | 330 | 5.8×10⁷ | 350 | 5.5 | 34.0 | 26.0 |
| 80 | 5 | do | 610 | 1.8×10⁸ | 800 | 5.2 | 35.0 | 26.5 |
| 90 | 5 | do | 1,050 | 9.3×10⁸ | 2,050 | 4.5 | 34.5 | 22.3 |

[a] Homogeneous spun fiber composed solely of nylon-6 (poly-ε-capramide).
[b] First component:second component=1:3, first component . . . sheath, second component . . . core.

EXAMPLE 3

A salt of polyethylene oxide having carboxyl groups introduced to its both terminals (number average molecular weight: approximately 2,100) with hexamethylenediamine was blended with ε-caprolactam and hexamethylene diammonium adipate at the following ratios:

| | Wt. percent |
|---|---|
| Polyethylene oxide dicarboxylic acid-hexamethylenediamine salt | 37.0 |
| ε-Caprolactam | 13.0 |
| Hexamethylene diammonium adipate | 50.0 |

The blend composition in molten state was heated to cause polycondensation reaction. Thus a block-copolyetheramide containing approximately 35 wt. percent of polyethylene oxide segments was synthesized. This block-copolyetheramide was blended with a nylon-66 polymer (relative viscosity in sulfuric acid, $\eta_r=2.60$) at a weight ratio of 1:9, to be used as the first component. The said component was spun into a side-by-side type composite filament, together with the above nylon-66 polymer as the second component. The ratio of components was 1:1.

Thus an antistatic polyamide fiber having excellent latent crimpabilty was obtained. The fiber developed the crimps as follows, upon a boiling water treatment. Properties of the fiber treated with boiling water:

Tenacity—5.4 g./d.
Elongation—37.0%
Crimp recovery [1]—88.5%
Number of crimps—21/25 mm.
Frictional static charge—520 v.

EXAMPLE 4

A polyether-diamine (number average molecular weight: 5,200), which was prepared by introducing amino groups into the both terminals of a copolyether of ethylene oxide and propylene oxide (copolymerization ratio=2:1), was reacted with equimolar sebacic acid to form a salt. The salt was polycondensed with ε-caprolactam. Thus a block-copolyetheramide containing approximately 40 wt. percent of polyether segments was synthesized, of which relative viscosity in m-cresol was 2.35. One part of this polymer was blended with 3 parts of a copolyamide of nylon-6 and nylon-66 (copolymerization ratio=85:15,

[1] Crimp recovery $= \dfrac{l_1 - l_o'}{l_1 - l_o}$ $l_1$: fiber length under the prescribed load (1/10 g./d.)
$l_o$: fiber length under the initial load (2/1000 g./d.)
$l_o'$: fiber length when the normal load is removed and again the initial load is exerted.

ponent, the core. The ratio of components was 1:1.

Thus obtained filament exhibited excellent latent crimpability and antistatic property which was substantially retained after repetitive washing.

Frictional static charge (20° C., 65% RH)

| | V. |
|---|---|
| After one washing | 55 |
| After 50 washings | 70 |

EXAMPLE 5

A salt formed of a polyethylene ether diamine (number average molecular weight: 3,800) and adipic acid was blended with hexamethylene diammonium adipate, and polycondensed in m-cresol solvent. The blending ratio was as follows:

| | Parts |
|---|---|
| Polyethylene ether diamineadipic acid salt | 52 |
| Hexamethylene diammonium adipate | 48 |
| m-Cresol | 100 |

The reactants were first heated for 3 hours at 230° C. in a closed system, and then nitrogen was passed through the system at atmospheric pressure. The heating was continued for an additional hour at 230° C., 2 hours at 250° C., and further an hour at 270° C. In the meantime, the m-cresol used as the solvent was distilled off.

Thus obtained polymer was formed into chips and removed of water-soluble component by extraction. The remaining chips (relative viscosity in m-cresol, $\eta_r=2.35$) was mixed with nylon-66 polymer chips (relative viscosity in sulfuric acid, $\eta_r=2.60$) and melt-blended. A concentric core-in-sheath type composite filament was spun from the above blend as the first component, and the nylon-66 polymer as the second component. The first component served as the sheath, and its ratio to the second component (core) was 1:3. Since the blend ratio of the block-copolyetheramide to the nylon-66 in the first component was 1:24, the average polyether segment content in the first component was approximately 2.0 wt. percent.

Thus obtained composite filament exhibited excellent antistatic property (electrical specific resistance—20× 10⁸Ω·cm.), and other qualities of substantially equal level as of conventional nylon-66 fibers.

EXAMPLE 6

A block-copolyethercapramide containing 60 wt. percent of polyether segments was prepared in the similar manner of Example 1, employing a polyethylene ether diamine having a number average molecular weight of 6,500. This product will be called the block-copolyethercapramide A.

Separately, another block-copolyethercapramide containing average 4 wt. percent of polyether segments was prepared in the similar manner, employing another polyethylene ether diamine (number average molecular weight: 1,000). The product is marked as block-copolyethercapramide B, although facet it was a mixture of the block-copolyethercapramide with a homopolymer of capramide.

The above two polymers and nylon-6 (relative viscosity in sulfuric acid, $\eta_r = 2.40$) were melt-spun into a composite filament as follows:

First component: A mixture of block-copolyethercapramide A with the nylon 6, at the blend ratio of 1:29
Second component: Block-copolyethercapramide B
Ratio of components: 1:1
Type: Side-by-side Thus obtained composite filament was well suited for practical usages, having not only excellent antistatic property (electrical specific resistance: $6.1 \times 10^7 \Omega.\text{cm}.$), but also crimpability and soft hand.

EXAMPLE 7

Seven types of block-copolymers composed of poly-ε-capramide segments and polyethylene oxide segments of different average chain length were prepared in the similar manner to Example 1. The polyether segment content in these block-copolyetheramides was in all cases 50.0 wt. percent. Each of them was blended with a nylon-6 polymer (relative viscosity in sulfuric acid, $\eta_r = 2.40$) at a ratio of 1:19, and used as the first component. Using the same nylon-6 polymer as the second component, concentric core-in-sheath type filaments were prepared. The first component was the sheath and the second, the core. The ratio of components was 2:3.

When average number of oxygen atoms in each polyether segment in the block-copolymer was less than 20, the antistatic property of the product filament appreciably deteriorated. Also the deterioration in initial modulus was conspicuous. Whereas, when the number of oxygen atoms exceeded 180, similarly notable deterioration in antistatic property and tensile strength took place.

From the foregoing, it can be understood that the suitable range of oxygen number is 20–180, inter alia, 45–130.

We claim:

1. A composite filament wherein at least two fiber-forming polymeric components are arranged in intimate adherence to each other along the length of said filament, one of said components being composed of a synthetic polyamide, the other of said components being composed of a polymer blend of a polyamide and a block-copolymer comprising polyamide segments and 15 to 85% by weight of polyether segments, said polyether segments being present in an amount of 0.1 to 10% by weight based on the weight of said composite filament.

2. The composite filament of claim 1, wherein said polyether segments in said block-copolymer contain an average of about 20 to 180 oxygen atoms.

3. The compoiste filament of claim 2, wherein said polyether segments in said block-copolymer contain an average of about 45 to 130 oxygen atoms.

4. The composite filament of claim 1, wherein said block-copolymer comprises polyamide segments and about 20 to 60% by weight of polyether segments, said polyether segments being present in an amount of about 0.3 to 5% by weight based on the weight of said composite filament.

5. The composite filament of claim 4, wherein said polyether segments in said block-copolymer contain an average of about 20 to 180 oxygen atoms.

6. A composite filament wherein at least two fiber-forming polymeric components are arranged in intimate adherence to each other along the length of said filament, one of said components being composed of a synthetic polyamide, the other of said components being composed of a polymer blend of a polyamide and a block-copolyetheramide which is a block-copolymer comprising polyamide segments and about 20 to 60% by weight of polyether segments, each of said polyether segments containing about 45 to 130 oxygen atoms, and the polyether segments being present in an amount of about 0.3 to 5% by weight based on the weight of said composite filament.

TABLE IV

| Average number of oxygen contained in each polyether segment | Polyether segment content in filament (wt. percent) | Frictional static charge (v.) | Tensile properties | | |
|---|---|---|---|---|---|
| | | | Tenacity (g./d.) | Elongation (percent) | Initial modulus (g./d.) |
| 18 | 1.0 | 1,500 | 5.6 | 34.5 | 19.1 |
| 23 | 1.0 | 950 | 5.7 | 35.0 | 23.3 |
| 46 | 1.0 | 800 | 5.6 | 34.5 | 26.8 |
| 92 | 1.0 | 650 | 5.6 | 34.0 | 27.3 |
| 130 | 1.0 | 700 | 5.7 | 35.0 | 27.5 |
| 180 | 1.0 | 950 | 5.3 | 34.5 | 27.0 |
| 200 | 1.0 | 1,300 | 4.4 | 34.5 | 26.1 |

References Cited

UNITED STATES PATENTS

| 3,384,681 | 5/1968 | Kobayashi et al. | 260—857 |
| 3,397,107 | 8/1968 | Kimura | 264—171 |
| 3,459,846 | 8/1969 | Matsui et al. | 264—171 |

ROBERT F. BURNETT, Primary Examiner

L. M. CARLIN, Assistant Examiner

U.S. Cl. X.R.

161—175, 177; 264—171